Sept. 15, 1936.  T. E. BRINTON  2,054,357
PISTON EXPANDER
Filed April 11, 1936
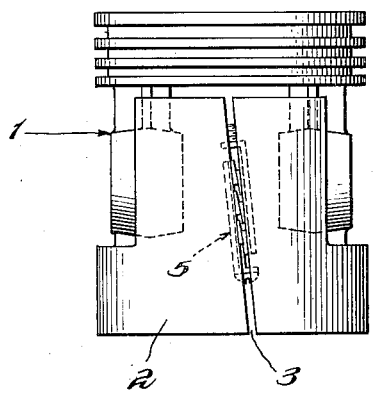
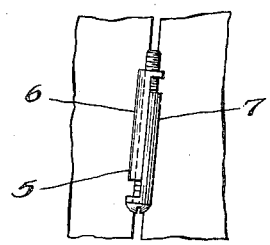
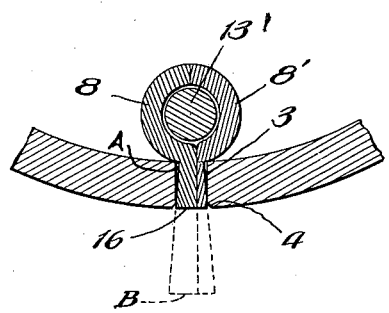
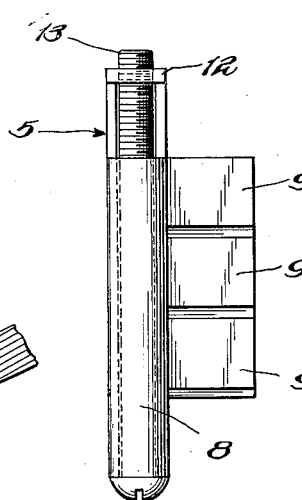
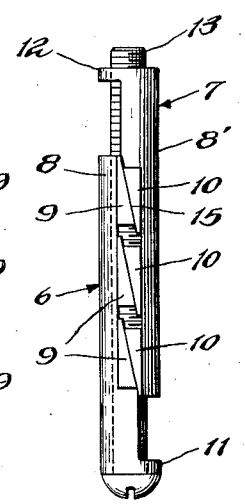
INVENTOR.
Thomas E. Brinton
BY Morris Spector
ATTORNEY.

Patented Sept. 15, 1936

2,054,357

UNITED STATES PATENT OFFICE 2,054,357

PISTON EXPANDER

Thomas E. Brinton, Waukegan, Ill.

Application April 11, 1936, Serial No. 73,922

6 Claims. (Cl. 309—12)

This invention relates to improvements in devices for expanding pistons, or the like.

After pistons have been in use for considerable periods of time there is wear on the piston and wear on the cylinder, or cylinder liner, resulting in inefficient and otherwise objectionable operation of the mechanism. It is one of the objects of the present invention to provide a simple device for expanding the skirt of a piston to increase the diameter thereof in order to make up for the wear that has taken place. More particularly, it is an object of the present invention to provide such a device which will be simple and economical of construction and which can be inserted in place after a minimum amount of machining of the piston. The only machining that must be done on the piston is that necessary for forming a slot in the skirt of the piston. Some pistons, as constructed today, are provided with one or more slots in the skirt thereof to facilitate the casting operation. When the expander of the present invention is used on such pistons no machining whatsoever of the piston is necessary.

It is a further object of the present invention to provide an expanding device of the character above set forth which can be inserted in place easily and quickly, and which, when inserted, is not likely to work its way out.

The device of the present invention comprises two wedges that are inserted in the slot in the piston skirt, and screw means for drawing the wedges together to expand the slot. The wedges are tapered longitudinally of the piston skirt, to effect expansion of the slot, and tapered also radially of the piston to prevent the wedge from working its way out by repeated movements radially inward of the piston. By this construction I attain still another object of the present invention in that after the expander has been inserted in place, and the piston used it is possible to expand the skirt still further, to take up the subsequent wear.

It is a still further object of the present invention to provide an expanding device of the above character which shall be simple and economical of construction. The device of the present invention can be made by a simple stamping operation.

The attainment of the above and further objects of the present invention will be apparent from the following specification taken in conjunction with the accompanying drawing forming a part thereof.

In the drawing:

Figure 1 is a side elevation of a conventional piston to which my invention has ben applied;

Figure 2 is a fragmentary view of the interior of the piston, facing in the direction of the expanding device;

Figure 3 is an enlarged view through the expanding device;

Figure 4 is an enlarged side view of the expanding device; and

Figure 5 is an end view of the same.

Reference may now be had more particularly to the drawing. At 1 is indicated a conventional piston having a skirt portion 2 in which is formed a slot 3. The expanding device 5, which is shown more particularly in Figures 3, 4, and 5, is shown in position with the wedge portions thereof in the slot 3. The expanding device 5 comprises two similar, but not identical, members 6 and 7. The members 6 and 7 comprise semi-cylindrical portions 8—8', from which project, radially, wedge members 9—9—9 and 10—10—10. The member 6 has a screw guiding lateral projection 11 at the lower end thereof, whereas the member 7 has a similar projection 12 at the upper end thereof. The projection 12 is threaded to receive the end of a screw, whereas the projection 11 is not threaded. This is the only difference between the members 6 and 7. The wedges 9 and 10 are tapered, radially, at a slight angle as illustrated in Figure 3. For instance, at the top innermost edge of the wedge 10 the dimension, in one construction, at the point indicated at "A", was .05 inch, whereas the corresponding thickness at "B" was .06 inch. The wedges 9 and 10 taper from a maximum thickness at one end to a minimum thickness at the opposite end, as can be seen from Figure 5. The two sets of wedges 9 and 10 are inserted in the slot 3 until the cylindrical portion of the expander bears against the interior surface of the piston skirt, the wedges being in such a position that they can readily be inserted through the slot from the inside of the piston skirt. This may be seen from Figures 1 and 2. Thereafter the screw 13 is tightened to draw the part 7 towards the part 6. When this is done the surfaces 15 of the wedges slide on one another, thus increasing the combined thickness of the two wedges, and spreading the slot of the piston. This is continued until the piston has been expanded the desired amount. Thereafter the portions of the wedges 9 and 10 that project outwardly of the piston skirt are cut off along the line 16 flush with the surface of the piston. The dotted lines in Figure 3 show the metal of the wedges that has been removed.

It is to be noted that the slot 3 in the piston is not tapered radially inward of the piston. As a result only the radially outermost portions of the edge of the slot 3 are in engagement with the piston expander. To avoid a roughening of the cylindrical surface, the corners of the slot 3 are beveled off, as indicated at 4. The bevel is very small, .003 inch, for example. Any metal that is displaced by the pressure of the wedge against the edge of the slot 3 will lie in this beveled corner and thus not produce a roughened exterior surface, such as might scratch the cylinder wall.

From the above description it is apparent that I have provided a simple, economical and reliable piston skirt expander which can be operated to expand the piston skirt any desired amount. After the expanded piston has been in use, and further wear has taken place, the same expanding device can be again operated to produce further expansion of the piston skirt.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. In combination with a piston having a slot in the wall thereof, a pair of oppositely tapered wedge members disposed in the slot, each of said wedge members having one side abutting one edge of the slot, the other side of one wedge member abutting against the other side of the other wedge member, each of said wedge members having an enlarged portion, said enlarged portions being spaced from one another in alignment with the slot and shaped to receive the shank of a screw, and a screw for drawing the two enlargements towards one another to move the wedge members on one another and expand the slot.

2. In combination with a piston having a slot in the wall thereof, a pair of oppositely tapered wedge members disposed in the slot, each of said wedge members having one side abutting one edge of the slot, the other side of one wedge member abutting against the other side of the other wedge member, and means for drawing the wedge members together comprising a screw threaded member engaging both wedge members.

3. In combination with a piston having a slot in the wall thereof, a pair of oppositely tapered wedge members disposed in the slot, each of said wedge members having one side abutting one edge of the slot, the other side of one wedge member abutting against the other side of the other wedge member, and means for drawing the wedge members together comprising a screw threaded member engaging both wedge members, said wedge members being tapered also in the direction radially of the piston and of a maximum thickness at the outer surface of the piston.

4. A piston expander comprising a pair of semi-tubular members having oppositely tapered wedges projecting therefrom.

5. A piston expander comprising a pair of semi-tubular members having oppositely tapered wedges projecting therefrom, and screw means extending through the semi-tubular members for moving the wedges along one another.

6. A piston expander comprising a pair of semi-tubular members having oppositely tapered wedges projecting therefrom, said wedges being tapered in a direction longitudinally of the semi-tubular members and also tapered radially of said semi-tubular members.

THOMAS E. BRINTON.